Jan. 15, 1935.  P. A. VOIGT  1,988,147
WALL ASSEMBLY
Filed Oct. 24, 1931   3 Sheets-Sheet 1
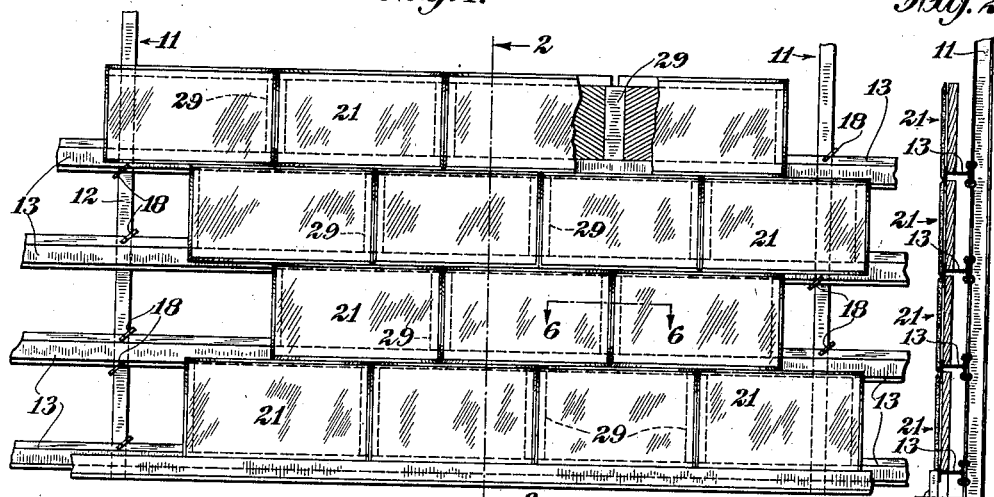
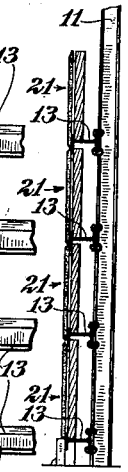
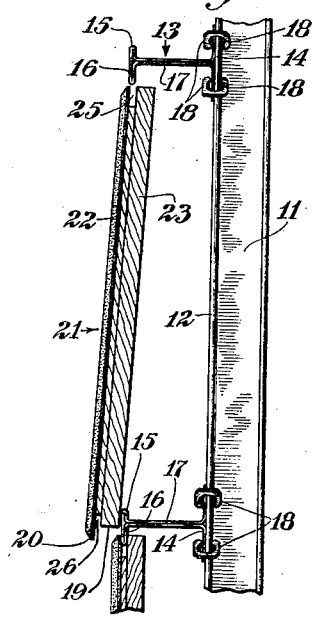
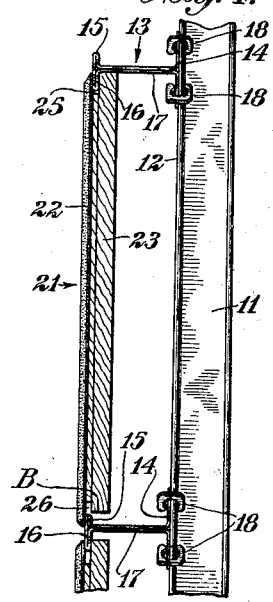
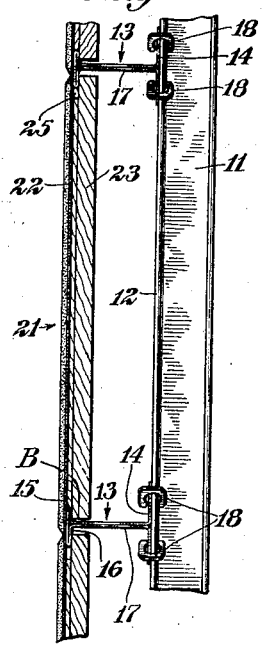
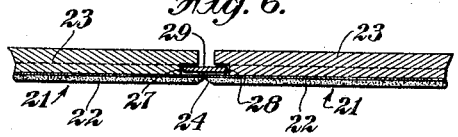
INVENTOR.
Paul A. Voigt.
BY D. N. Halstead
ATTORNEY.

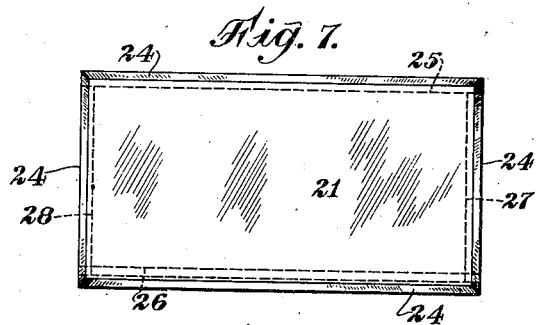
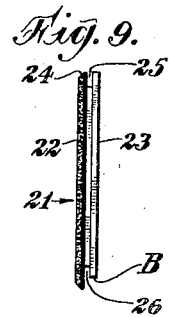
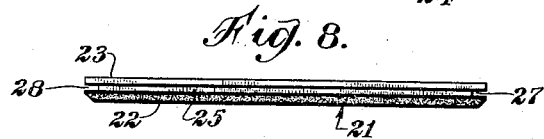
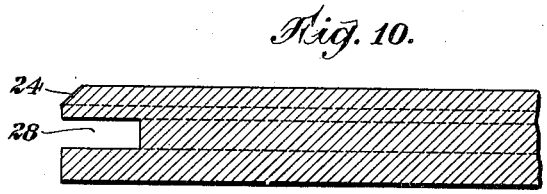
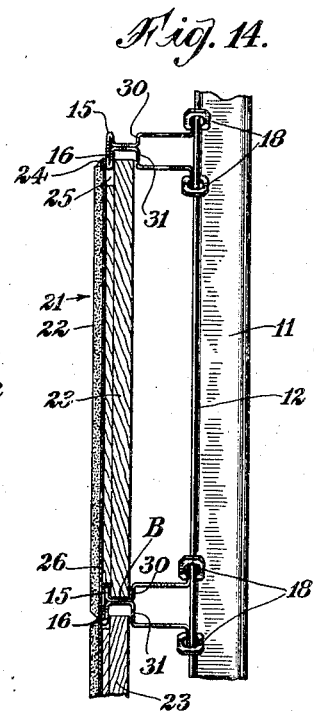
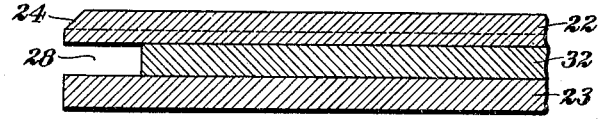
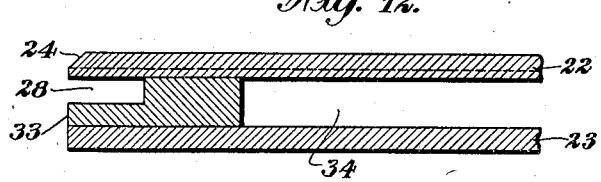
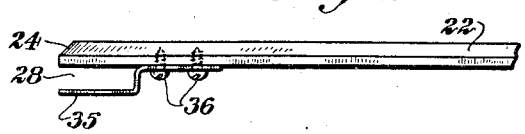

INVENTOR
Paul A. Voigt.
BY
ATTORNEY

Patented Jan. 15, 1935

1,988,147

UNITED STATES PATENT OFFICE 1,988,147

WALL ASSEMBLY

Paul A. Voigt, Ozone Park, N. Y., assignor to Johns-Manville Corporation, New York, N. Y., a corporation of New York Application October 24, 1931, Serial No. 570,899

18 Claims. (Cl. 72—19)

This invention relates to a replaceable unit structure and particularly to one in which panels of building material are engaged by means of grooves in the edges thereof with fastening members supported on a sub-structure. The invention pertains especially to a structural assembly comprising panels with grooves in opposite edges thereof engaging flanges of a supporting sub-structure, the flange engaging the groove in one edge of a panel suitably being wider than the flange engaging the groove in the opposite edge of the panel and the said grooves in opposite edges preferably being of unequal depth.

Objects of the invention are to provide a structural assembly suitable for use in the wall of a building that may be constructed from parts of standard size and form, that is decorative and durable, that may be a satisfactory thermal or sound insulator, that is fireproof, that contains panels replaceable by other panels of the same or different thickness, and/or that contains imperforate panels.

In the prior art of constructing assemblies of units of finishing material, so-called tiles or panels, units have been pierced with fastening members, such as nails, bolts, or screws, or secured to a supporting sub-structure by means of clips attached at the back to the sub-structure and terminating at the front in flanges extending over the edges of the units. In either case, the result is not satisfactory for all purposes, inasmuch as the fastening members are either left exposed to view or are covered by some overlaid member. The cracks between the several tiles or panels may permit breathing of the wall, permit entrance of water, or produce an uneven or unsightly joint.

An embodiment of the present invention is illustrated in the following drawings in which:

Fig. 1 is a front elevation of a wall assembly constructed in accordance with the invention.

Fig. 2 is a vertical cross-section on line 2—2 of Fig. 1 in the direction of the arrows.

Figs. 3, 4 and 5 are enlarged side edge views illustrating various details of construction and also the method of installing or removing a panel from the wall.

Fig. 6 is an enlarged sectional view on lines 6—6 of Fig. 1 in the direction of the arrows.

Fig. 7 is a plan view of a panel adapted to use in the present invention.

Figs. 8 and 9 are vertical and horizontal edge views, respectively, of the same.

Figs. 10, 11, 12 and 13 are enlarged edge views of portions of panels adapted to use in modifications of the invention.

Fig. 14 is an enlarged vertical edge view of a portion of a wall assembly comprising a modified form of fastening member provided with a shoulder for limiting the movement of the panel.

In the various drawings like reference characters refer to like parts.

Figure 15:
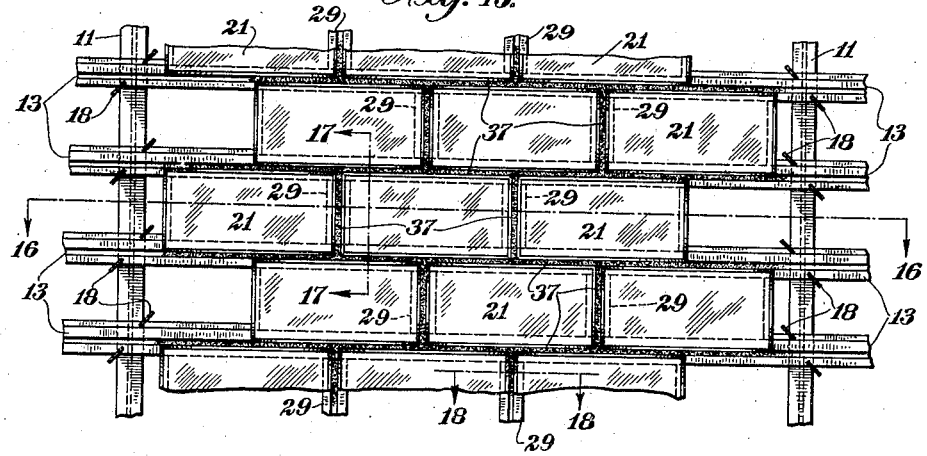
Fig. 15 is a front elevation of a wall assembly comprising a modified form of fastening member and a sealed joint between the panels.

There is illustrated a wall assembly including a supporting substructure comprising upright I-studs 11, with forward flange portions 12, and transversely placed rails 13, the rails being illustrative of fastening members or girts. The fastening members have a base flange 14 (Figs. 3, 4 and 5) secured by the C-clamps 18 to the flange 12 of the supporting I-stud and have also a web member 17 attached at the forward end to an upwardly extending and relatively narrow flange 15 and to a downwardly extending wider flange 16.

The panels 21 have a front portion 22 and a back portion 23 with grooves 25 and 26 extending inwardly from opposite side (upper and lower) edges, the groove in the upper edge being deeper than in the lower. The back portion of the panel at its lower extremity ends at position 19 which is preferably somewhat above the position 20 at which the front portion of the panel ends.

The panels meet in edgewise manner, to form a joint therebetween, and are provided in adjacent edges of the panels with grooves having their open faces turned towards each other. In these grooves between adjacent members and extending substantially the full length thereof there may be engaged a rigid, elongated member serving to keep the panels in alignment and to close the joint. Thus, the panels may have grooves also in the end (vertical) edges, that is, in the edges of lesser length than the side edges, as illustrated particularly in Fig. 6, designated as 27 and 28 and engaging a bar support in the form of a rigid spline 29, such as one of metal, that is not secured to the sub-structure except by engagement in the panels. The spline members prevent lateral movement between abutting end (vertical) edges of adjacent tiles.

The panels comprise suitably a hard front portion such as a slab consisting of 85% of Portland cement and 15% of asbestos, by weight. The back portion may consist of the same or a different material, as, for example, a cellular material adapted to thermal insulation, such as a board of composited wood fibers or cane fibers. In such a composited panel, the groove may be formed within the softer and more easily sawed back portion. This construction is illustrated in Figs. 7, 8 and 9.

Figs. 10–13 illustrate end edge views of parts of modified panels. Thus a modification of panel is illustrated in Fig. 10 in which the panel is of one material throughout.

Another modification is shown in Fig. 11 in which there are a front portion 22, a rear portion 23 and central portion 32, all of different materials.

Fig. 12 shows a modification in which the central portion of the panel is provided with the air space 34, defined between the front and rear portions of the panel and the spacing member 33 inserted between the said front and rear portions, near the edges thereof.

Fig. 13 shows a modified form of the panel in which the groove for engaging the fastening member is formed by a metal member 35 fastened by screws 36 to the edge portion 22 of the panel and shaped in such a manner as to form the groove 28 adapted to engage the fastening member.

The panels may have beveled front edges 24.

Fig. 14 illustrates a modified form of fastening member in which the fastening member or rail has not only forward flanges for engaging grooves in panels but also shoulders or intermediate portions 30 and 31, suitably extending parallel to said flanges and behind back portions of panels and co-acting with the flanges to limit the movement of the panels. A rear portion of the fastening member secures the said intermediate portion to the sub-structure, in spaced relationship thereto.

In Fig. 15 are shown caulked joints 37 between beveled-edge panels, the sealing material being suitably Portland cement or other hydraulic cementitious material, so applied in mortar-bearing recesses as to make the joint water-tight.

Figure 16:
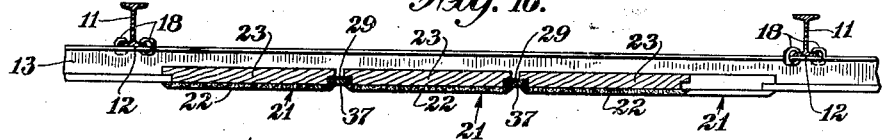
Fig. 16 is a cross-section on line 16—16 of Fig. 15.
Figure 17:
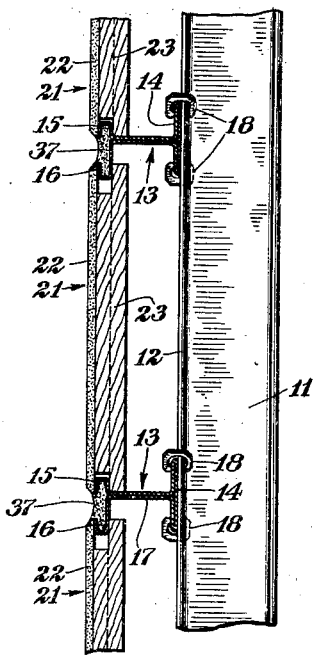
Fig. 17 is an enlarged cross-section on line 17—17 of Fig. 15.
Figure 18:
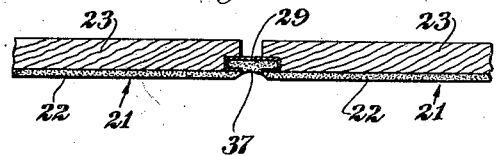
Fig. 18 is an enlarged cross-section on line 18—18 of Fig. 15.

Convenient means of supporting the cement in the joints or recesses are illustrated in Figs. 16, 17 and 18. The splines 29 are hollow, with an open front portion, to give a modified C-shape of cross-section. Also, the forward flanges 15 and 16 on the fastening members are hollow and open at the front, to give also a modified C-shape adapted to receive the cement.

Fig. 17 shows a sectional view of a wall construction comprising tile (panel) elements 21, spaced tile-supporting members in the form of modified I-beam with web members 17, means securing the tiles to the supporting members including the flanges 15 and 16 engaged in grooves in the edges of adjacent panels, and recesses in the flanged portion of the said tile-supporting members, the recesses carrying the mortar or caulking material 37.

To insert a panel into a wall assembly of the type described, the groove in the upper edge of the panel is engaged with a downwardly extending (wider) flange of a fastening member. The panel is pushed upward tightly against the flange and is then placed in position so that the groove, suitably shallow, in the lower edge of the panel is directly over the narrow flange of a lower fastening member. The panel is then lowered to seat it. See Figs. 3, 4 and 5.

To remove a panel the operations are reversed, the panel being slipped upward and then disengaged, first from the bottom flange of the fastening member and then from the upper.

The web element 17 of the fastening member 13 is suitably of such a length as to space the panel away from the I-beam 11 of the supporting substructure. With this spaced relationship, it is possible at any time to replace previously inserted panels by thicker ones, as for example, when it is desired to install a panel having a closely perforated or permeable front portion and a back portion of sound-absorbing or heat-insulating material.

The size of the panel or tile may be varied within limits. There has been used satisfactorily panels 2 x 4 ft. The panels may be placed in the wall with their longest dimension horizontal or vertical. The panels may be inserted from the front into a wall, as distinguished from types of construction in which panels are engaged at the top and bottom, by inserting at a special place, as at the end of a structure for holding a row of panels, and are then slid sidewise along the supports to the desired position.

The composition of the panel may also be varied although it has been found desirable to have the front surface hard, durable, and washable.

The sealing mixture used for rendering joints between panels water-tight may be a cementitious material adapted to harden on standing, as for example, an aqueous mixture of Portland cement or gypsum. After application, the sealing mixture in the recess encircling the four sides of each tile is suitably smoothed down to simulate a mortar or masonry joint.

To permit abutment of the front portions of adjacent panels in a finished wall assembly, the grooves in the edges of the panels are suitably deeper than the width of engaging flanges of the fastening member or of the vertical splines. Also, the back portion is cut away, as illustrated in Figs. 3, 4, 5, 9, and 14 to permit the front portion at one edge to pass the position of the web member 17 of the girts, which web member may act as a stop to the downward movement of a panel supported on a girt.

The panels and the supporting substructure may be arranged to form a wall in which some or all of the panels are arranged with their longest dimension in a vertical position. Also, the said fastening members may be arranged vertically, to engage grooves in the vertical edges of the panels, splines engaging the grooves in the horizontal edges. Further, the wall may be assembled from panels of varying sizes, with broken joints, to imitate a broken ashlar masonry design.

The invention is especially adapted to provide a fireproof, hollow wall, of fireproof construction, the interior of which may be filled with thermal insulating or sound-absorbing material, such as mineral wool, asbestos fibers, or the like.

While the invention has been illustrated by the description of an assembly comprising panels with grooves in all four edges thereof, it is to be understood that panels having grooves in only two opposite edges may be used, to give a less firm wall assembly than that illustrated. Thus, there may be used panels with only one pair of grooves, provided in opposite edges of the panel and adapted to engage girt flanges of unequal width.

1,988,147

The terms "panels" and "tiles" or "tile elements" are used herein synonomously.

In view of the fact that many variations from the illustrative details given may be made without departing from the scope of the invention, it is intended that the invention should be limited only by the terms of the claims.

What I claim is:

1. A structural assembly including a supporting sub-structure, panels having grooves extending inwardly from opposite edges thereof, and rigid fastening members having each a back portion secured to the substructure and a front portion terminating in oppositely extending elements engaged in the grooves in the edges of the panels, the depth of one of the grooves being greater than the width of the engaging element, to permit abutment of the front portions of adjacent panels.

2. A multiple-unit wall including a supporting sub-structure, panels having grooves extending inwardly from opposite edges thereof, one of the said grooves being substantially deeper than the other, and fastening members comprising oppositely extending rigid elements engaged in the said grooves.

3. A multiple-unit wall including a supporting sub-structure, panels with grooves extending inwardly from opposite edges of the panels, and fastening members comprising metal flanges engaged in an edgewise manner in said grooves, the flange engaging the groove in one of the said edges being wider than the other flange.

4. A multiple-unit wall including a supporting sub-structure, panels with grooves extending inwardly from the upper and lower edges of the panels, the groove in the upper edge being substantially deeper than the other, and girts of approximately I-beam shape, comprising each a base member secured to the substructure, a web member extending in a direction away from the sub-structure, and two flanges extending in either direction from the forward edge of the web member and engaged in an endwise manner in said grooves.

5. A multiple-unit wall including a supporting sub-structure, panels with grooves extending inwardly from all edges thereof, fastening members secured to the sub-structure and provided with oppositely extending elements engaged in grooves in opposite edges of the panels, and rigid elements of the type of splines engaged in grooves not occupied by the said oppositely extending elements.

6. A multiple-unit wall including a supporting sub-structure, panels with grooves extending inwardly from the upper and lower and also vertical edges of the panels and approximately parallel to the faces thereof, the groove in the upper edge being substantially deeper than that in the lower edge, and girts of approximately I-beam shape, comprising each a base member secured to the sub-structure, a web member extending in a direction away from the sub-structure, and two flanges extending upwardly and downwardly, respectively, from the forward edge of the web member and engaging in an edgewise manner in said grooves, the downwardly extending flange being substantially wider than the other, and vertical splines consisting of metal bars engaged in grooves in the vertical edges of the panels, all flanges and splines being concealed by abutting edges of the front portions of the panels.

7. A multiple-unit wall including a supporting sub-structure, panels with grooves extending inwardly from the upper and lower edges of the panels and approximately parallel to the faces thereof, and girts of approximately I-beam shape, comprising each a base member secured to the sub-structure, a web member extending in a direction away from the sub-structure, and two flanges extending upwardly and downwardly from the outer edge of the web member and engaging in an edgewise manner in said grooves, the flange engaging the groove in the upper edge of the panel being substantially wider than the other and both flanges being hollow and of open front portion to form approximately a C-shape or equivalent shape adapted to receive cementitious material.

8. In combination in a wall construction, tile elements, spaced apart tile-supporting members, means for securing the tiles to the supporting members, and a mortar-bearing recess carried by said supporting members.

9. In combination in a wall construction, tile elements, spaced apart tile-supporting rails, means for securing the tile member to the supporting rails, and spline elements to prevent relative lateral movement between abutting side edges of adjacent tiles, said rails and said spline elements having each a mortar carrying recess therein.

10. In combination in a wall construction, tile elements, spaced apart tile-supporting members, means for securing the tiles to the supporting members, and recessed means encircling the four sides of each tile adapted to carry a cementitious material in said recesses.

11. In combination in a wall construction, tile elements having a groove in each edge thereof and spaced tile-supporting rails comprising a base, web, and oppositely directed flanges carried by said web with one flange wider than the other, said tile elements being removably maintained between adjacent supporting rails by co-action between the top edge groove thereof and the longer flange of a supporting rail and between the bottom edge groove of the tile and the shorter flange of the next lower rail.

12. In combination in a multiple-unit wall construction, structural panels of hard front portion and yieldable thermal insulating rear portion provided with grooves in opposite edges of the said rear portion of the several panels and fastening members comprising oppositely extending elements engaged in the said grooves, whereby yieldable attachment is secured.

13. In combination in a multiple-unit wall construction, structural panels of cement and asbestus front portion and yieldable thermal insulating rear portion with grooves of unequal depth in two opposite edges of the said rear portion of the several panels and fastening members and comprising flanges engaging in said grooves whereby yieldable attachment is secured.

14. A metal section comprising a web member and two flanges extending, in opposite directions, at right angles from a side edge of the web member and adapted to engage in grooves in the edges of panels in a multiple-unit wall assembly, said flanges being of unequal width.

15. A multiple-unit structural assembly comprising in combination a supporting sub-structure, panels meeting edgewise to form a joint therebetween, provided in the adjacent edges thereof with grooves having their open faces turned toward each other and extending substantially the full length of the said edges, means for securing the panels to the said sub-structure, and an elongated rigid element engaged in, disposed completely within, and extending substantially the full length of the said grooves, whereby the said panels are maintained in alignment and the joint therebetween is closed.

16. A multiple-unit structural assembly comprising in combination a supporting sub-structure, panels, and a fastening member securing the panels to the sub-structure, the said member including a forward flanged portion engaging the panels, an intermediate portion engaged behind the panels, a web element connecting the said flanged portion to the said intermediate portion, and a rear portion securing the said intermediate portion to the supporting sub-structure, in spaced relationship thereto.

17. A multiple-unit structural assembly comprising in combination a supporting sub-structure, panels, and a fastening member securing the panels to the sub-structure, the said member including a forward flanged portion engaging the panels, an intermediate portion engaged behind the panels, a web element connecting the said flanged portion to the said intermediate portion, and a rear portion securing the said intermediate portion to the supporting sub-structure, in spaced relationship thereto, the said panels being of different thicknesses and the fastening members being of different overall width, from front to back, and adapted to maintain the panels in alignment over the face portions thereof.

18. A structural assembly comprising a supporting sub-structure a preformed panel having front and back portions and a fastening member disposed completely behind the front portions of the panel, extending substantially the full length of and engaging the edge of the panel, and securing the panel to the sub-structure, the forward portion of the panel at the said edge thereof and for substantially the full extent thereof projecting beyond the said rear portion, whereby the panel is supported along its entire edge and the fastening member is concealed from view from a forward position.

PAUL A. VOIGT.